No. 618,640. Patented Jan. 31, 1899.
I. BURK.
ICE TONGS.
(Application filed Nov. 7, 1898.)
(No Model.)
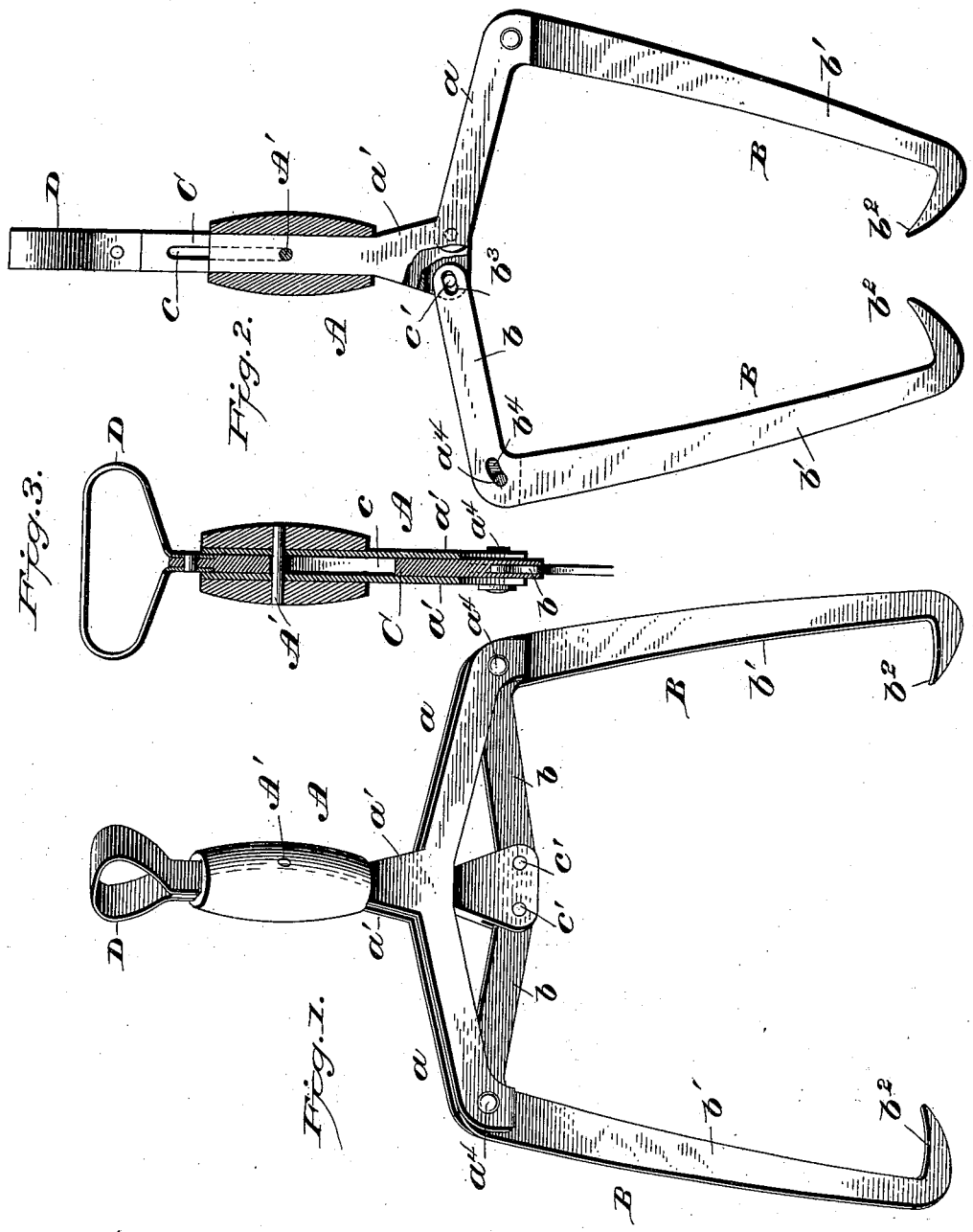
WITNESSES
L. S. Elliott.
James R. Mansfield.
INVENTOR
By: Isaac Burk
Alexander & Dowell
Attorneys

UNITED STATES PATENT OFFICE.

ISAAC BURK, OF LAMBERTVILLE, NEW JERSEY.

ICE-TONGS.

SPECIFICATION forming part of Letters Patent No. 618,640, dated January 31, 1899.

Application filed November 7, 1898. Serial No. 695,741. (No model.)

*To all whom it may concern:*

Be it known that I, ISAAC BURK, of Lambertville, in the county of Hunterdon and State of New Jersey, have invented certain new and useful Improvements in Ice-Tongs; and I hereby declare that the following is a full, clear, and exact description thereof, reference being had to the accompanying drawings, which form part of this specification.

This invention is an improvement in icetongs; and it consists in the novel construction thereof illustrated in the drawings and hereinafter described and claimed.

In the drawings, Figure 1 is a view of the ice-tongs open. Fig. 2 is a view thereof, partly in section, closed; and Fig. 3 is a detail.

Referring to the drawings, A designates the handle of the tongs, which is roughly of inverted-Y shape and provided with opposite lateral arms or bifurcations $a$, as shown. Said arms may be composed of two parallel flat metal pieces $a'$, as shown. To the extremities of these arms are pivoted the legs B of the tongs, which, as shown, are roughly L-shaped, and are pivoted at their angles to the extremities of the arms $a$, with their shorter parts $b$ extending horizontally inward toward each other and their longer parts $b'$ depending from the handle and provided at their lower ends with inwardly-projecting biting-teeth $b^2$.

The adjoining inner ends of parts $b$ are pivotally connected to a sliding bar C that extends through the handle A, and its upper end is provided with a handpiece D. When this bar is pushed down through the handle, the legs are extended, as indicated in Fig. 1, and when the bar is pulled up the tongs are closed upon the object to be carried, as indicated in Fig. 2.

The vertical movement of bar C, and consequently the extent of opening and closing of the tongs, may be controlled by means of a slot $c$ in the bar C, which is transfixed by a pin $A'$, attached to the handle A.

The pivotal connections between the parts $b$ of legs B and bar C may be by means of slots $b^3$ in the legs transfixed by pins $c'$ in the bar, so as to prevent binding of the joints when the tongs are opened and closed, and the extent of movement of the legs might be increased by having the pivotal connections between the tong-legs and the handle formed by curved slots $b^4$ in the legs and pins $a^4$ in the arms, as shown.

Of course the slots might be made in the bar C or arms instead of in the legs and the pins be secured to the legs instead of to the bar C or to the arms, as described.

It will be observed that when the tongs are closed the upper parts of the legs are more or less entered between the parts $a'$ of the handle and are thereby more firmly held against lateral vibration or play relative to each other.

Having thus described my invention, what I therefore claim as new, and desire to secure by Letters Patent thereon, is—

1. In ice-tongs, the combination of a bifurcated handle having arms, the angle tonglegs pivoted at their bends to the extremities of the handle-arms, a bar slidable through the handle, and pivotal connections between the horizontally-disposed parts of the tonglegs and said bar, for the purpose and substantially as described.

2. In ice-tongs, the combination of the Y-shaped handle, the L-shaped tong-levers having pivotal connections at their angles to the extensions of the bifurcations of the handles, and a bar slidable through the handle, having a handpiece on its upper end, and pivotally connected at its lower end to the shorter arm of the tong-levers, for the purpose and substantially as described.

3. In ice-tongs, the combination of the bifurcated handle, the L-shaped tong-legs having pivotal slot-and-pin connections at their angles to the extensions of the bifurcations of the handles, and a bar slidable through the handle, having a handpiece on its upper end, and slot-and-pin pivotal connections between its lower end and the shorter arms of the legs, for the purpose and substantially as described.

4. The herein-described ice-tongs, consisting of a handle A, having opposite arms composed of parallel metal pieces $a'$, the slidable bar C extending through said handle, the angle tong-legs pivoted at their bends to the extremities of said arms and having their upper parts pivotally connected at their inner ends to the lower end of the slidable bar C, for the purpose and substantially as described.

5. The herein-described ice-tongs, consisting of a handle A, having opposite arms composed of parallel metal pieces $a'$, the slidable bar C extending through said handle having a handpiece on its upper end and limited in its movement by a slot and pin substantially as described, and the L-shaped tong-levers pivoted at their angles to the extremities of the handle bifurcations and pivotally connected at their inner ends to the lower end of the slidable bar C, for the purpose and substantially as described.

In testimony that I claim the foregoing as my own I affix my signature in presence of two witnesses.

ISAAC BURK.

In presence of—
ELIAS C. BOWDEN,
ELLWOOD K. METZ.